Feb. 16, 1937. E. M. DOBBS 2,071,256
AIR PRESSURE INDICATOR FOR TIRES
Filed March 25, 1935 3 Sheets-Sheet 1

Inventor
E. M. Dobbs.
By Lacey & Lacey,
Attorneys

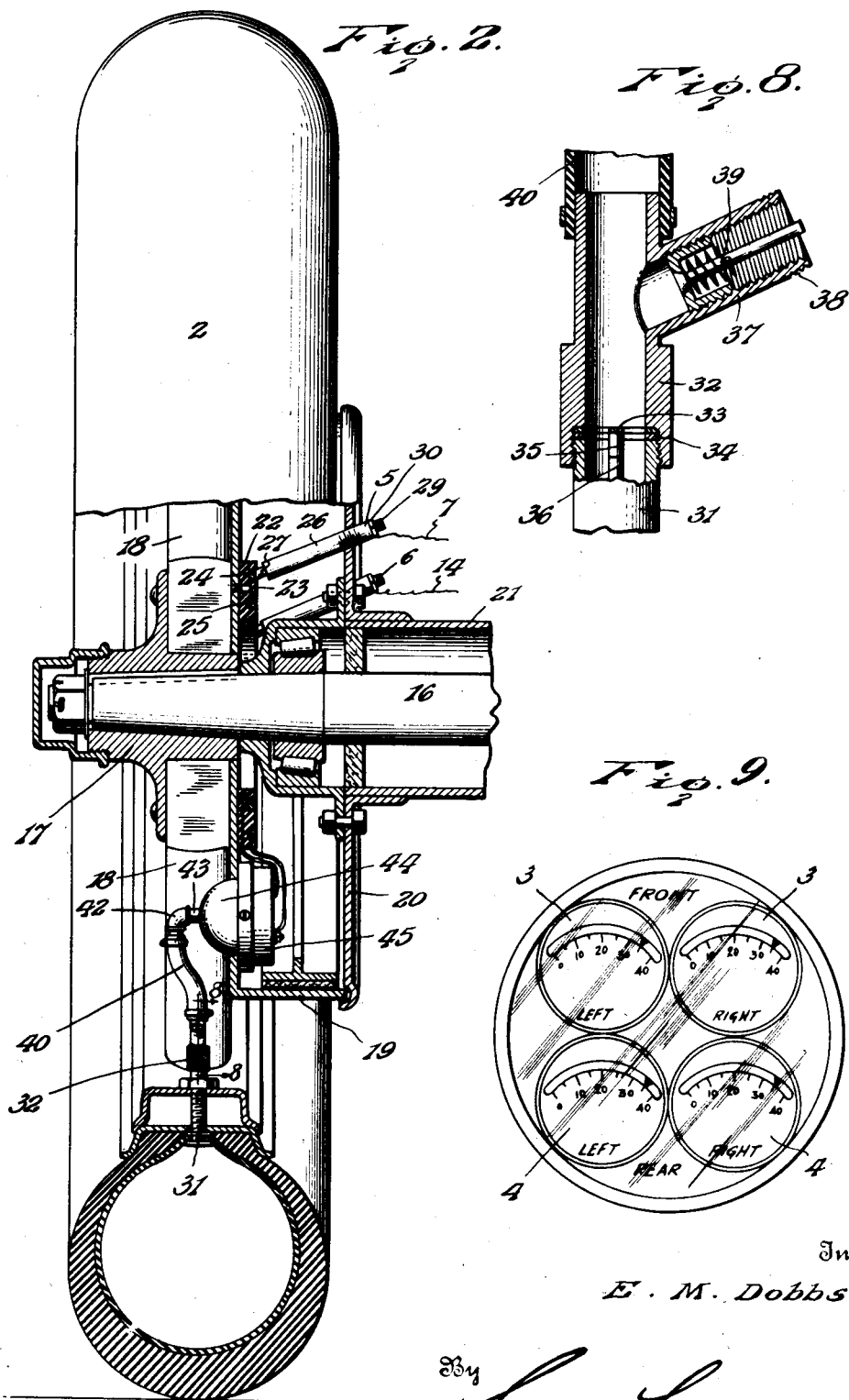

Feb. 16, 1937.  E. M. DOBBS  2,071,256
AIR PRESSURE INDICATOR FOR TIRES
Filed March 25, 1935  3 Sheets-Sheet 3
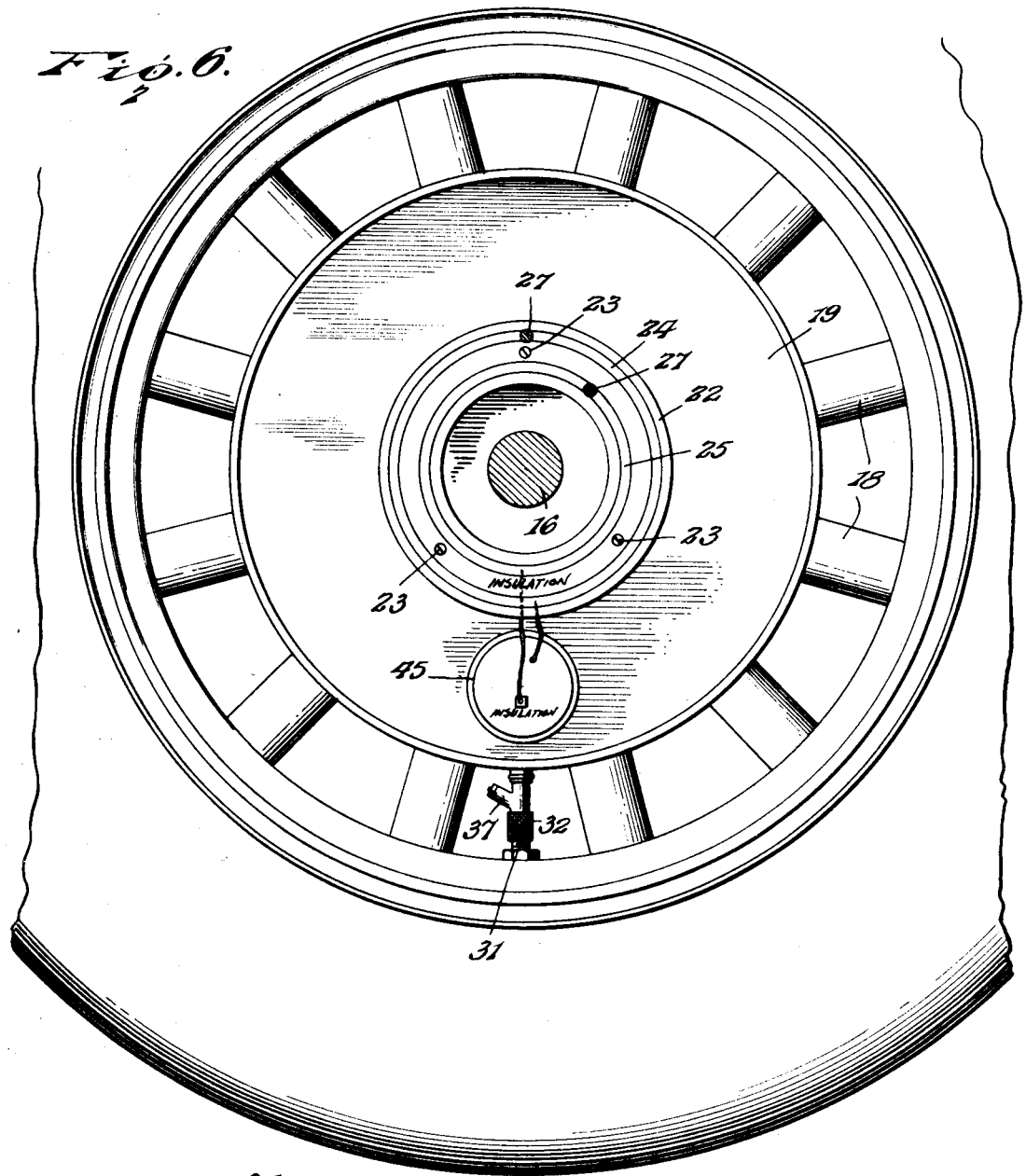
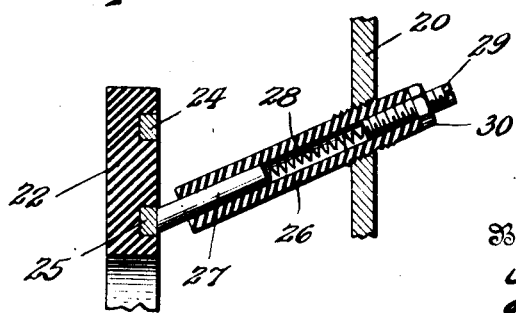

Patented Feb. 16, 1937

2,071,256

UNITED STATES PATENT OFFICE 2,071,256

AIR PRESSURE INDICATOR FOR TIRES

Eugene Melton Dobbs, Mason, Tex., assignor of one-eighth to Leonard Miller, Brownwood, Tex.

Application March 25, 1935, Serial No. 12,992

3 Claims. (Cl. 201—48)

This invention relates to an improved air pressure indicator adapted to be installed in an automobile or other vehicle having its wheels equipped with pneumatic tires, and one object of the invention is to provide an indicator including a set of dials corresponding to the number of tires and actuating means associated with the individual wheels and each operatively connected with its companion dial whereby the pressure of air in the tires may be indicated by the respective dials and thus the operator of the automobile or other vehicle enabled to easily determine whether the tires are properly inflated.

Another object of the invention is to so construct and assemble the pressure indicating means that when it is installed a common source of electric energy may be employed to energize all of the dials and their operating means without interference between the various dials and their operating means.

Another object of the invention is to provide in an apparatus of this character, operating means for each dial including a rheostat for controlling flow of current to the companion dial and actuating means for the rheostat including a diaphragm affected by variations in the pressure of air in a tire. Therefore, while each dial will be controlled by an electric circuit, a rheostat forming part of the circuit will be controlled by air pressure.

Another object of the invention is to so construct the air pressure indicating apparatus that it may be installed upon automobiles having front and rear wheels of a conventional construction.

My invention is illustrated in the accompanying drawings, wherein

Figure 2 is an enlarged view showing a wheel and apparatus associated therewith, the view being partially in section and partially in elevation.

Figure 6 is a view showing the wheel of Figure 2 in side elevation when looking at the inner side of the wheel.

Figure 7 is an enlarged fragmentary sectional view of a contact brushing forming part of the apparatus.

Figure 8 is an enlarged sectional view taken along the line 8—8 of Figure 2.

Figure 9 is a view of the indicating dials and housing therefor.

Figure 1:
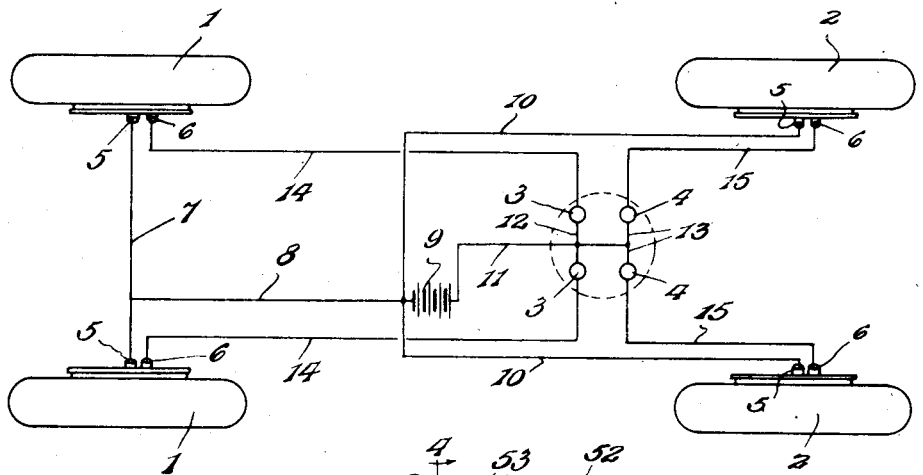
Figure 1 is a wiring diaphragm of the improved pressure indicating apparatus.

This improved pressure indicating means is for use in connection with an automobile or other vehicle having pneumatic tires 1 and 2 upon its front and rear wheels and includes a set of dials 3 and 4 which are similar in construction to a voltmeter and are mounted in a suitable housing adapted to be carried by the instrument board of an automobile where the indicators may be readily seen by the operator of the automobile. Actuating mechanism for the indicators are carried by the front and rear wheels and each includes a set of terminals 5 and 6. The terminals 5 of the front wheels are connected by a wire 7 from which extends a wire 8 connected to one side of a battery 9 which may be the usual battery provided upon automobiles for lighting and starting purposes. Branches 10 lead from the wire 8 to the terminals 5 of the rear wheels. To the other side of the battery is connected a wire 11 having branches 12 and 13 leading therefrom to the indicators 3 and 4 and these indicators are connected with the terminals 6 of the front and rear wheels by wires 14 and 15. It will thus be seen that while all of the indicators are in circuit with the battery 9 they will be individually controlled and each may register the pressure of the tire with which it cooperates.

The wheels are carried by the usual front and rear axles, one of which is shown in Figure 2 and indicated by the numeral 16, and referring to Figure 2 where a rear axle has been shown, it will be seen that the wheel is provided with the usual hub 17 which rotates about the spindle of the axle and carries spokes 18 to which a brake drum 19 is secured. There has also been provided a side plate 20 for the brake drum which is firmly secured about the axle casing 21 so that this side plate remains stationary when the wheel is rotating.

A ring or annular supporting disc 22 formed of insulating material is secured concentric to the hub 17 by screws or equivalent fasteners 23 and in this disc are embedded conductor rings 24 and 25 with which the terminals 5 and 6 cooperate. These terminals 5 and 6 are of duplicate construction, and referring to Figure 7 it will be seen that each has a tubular body 26 which is threaded through an opening formed in the side plate 20. The tubular body extends diagonally, and within the inner end portion of the body is mounted a brush 27 of conductive material which is extended from the body for engagement with one of the conductor rings by a spring 28. The spring 28 bears at one end against the inner end of the brush 27 and at its other end bears against a stem 29 which is threaded into the outer end portion of the body and carries a securing nut 30 which serves to hold the stem in a set position after the stem has been adjusted to apply desired tension upon the spring and cause the brush to be held in contact with the cooperating contact ring. This stem also constitutes an element to which the wire 5 or 14 may be secured either through the medium of the nut 30 or by means of another nut threaded upon the stem with the end of the wire bent about the stem and firmly gripped between the nut 30 and the second nut.

The tire is provided with the usual inflating stem 31 through which air is to be forced into the tire but when this pressure indicating apparatus is in use the cap usually screwed upon the stem will be removed and a coupling sleeve 32 threaded upon the stem. A spider 33 is mounted in the lower end portion of the coupling sleeve 32, together with a gasket 34 to form an air tight joint between the stem and the coupling, and referring to Figure 8 it will be seen that the spider carries a lug 35 for engaging the stem 36 of the usual valve provided in the inflating stem 31 and holding the valve of the inflating stem open when the coupling 32 is applied. A side arm 37 extends from the sleeve 32 and has its outer end portion externally threaded, as shown at 38, to receive the cap removed from the inflating stem 31. This side arm is also internally threaded in order that a valve 39 of the type carried in the inflating stem 31 may be mounted in the side arm and permit inward passage of air through the side arm to inflate the tire but prevent air from escaping through this side arm after the tire has been inflated. The outer end of the coupler 32 is open and about this end portion of the sleeve is secured a tube 40 of rubber or similar material which is flexible but impervious to air. This flexible tube 40 has its other end secured about a nipple 41 extending from an elbow 42 carried by the shank or neck 43 of a dome or shell 44 forming a closure for one end of a housing 45 in which a rheostat is mounted, and referring to Figure 3 it will be seen that when the shell or dome 44 is secured to the housing 45, marginal portions of a flexible diaphragm 46 will be gripped between the circumferentially extending flange 47 of the shell and the annular edge of the housing 45 and the diaphragm firmly held in place between the shell and housing. Therefore, while air may pass through the coupling and tube 40 into the shell 44 it cannot enter the housing 45. The air will, therefore, act against the diaphragm to spring the diaphragm from its normal position indicated by dotted lines in Figure 3 toward the bulged position shown in full lines and a stem or shank 48 secured centrally through the diaphragm will be shifted longitudinally as the diaphragm is flexed by varying air pressures in the shell. The end portion of the stem or shank located within the shell carries a collar 49 against which one end of a spring 50 bears, the other end of the spring bearing against a hollow adjusting screw 51 which is threaded through the shank or neck 43. By this arrangement the screw 51 may be adjusted to properly tension the spring and cause the diaphragm to be so adjusted that when it is properly set the pointer of the cooperating dial 3 or 4 will accurately indicate the pressure of air in a tire. It will be understood that after the screw has been once adjusted further adjustment will be ordinarily unnecessary.

Figure 3:
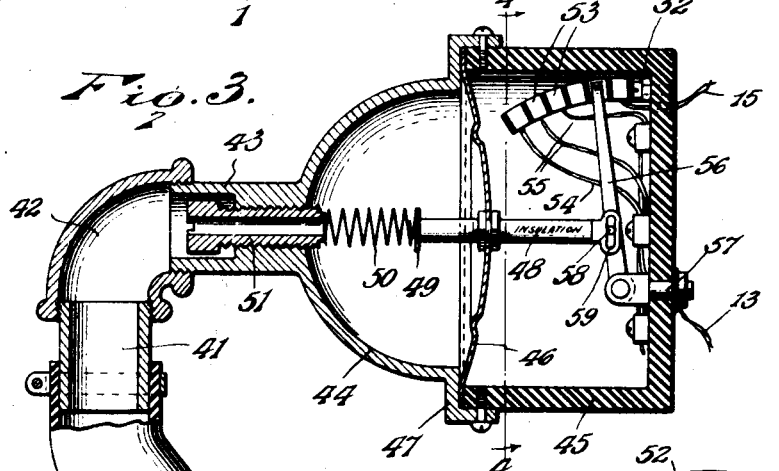
Figure 3 is an enlarged sectional view of the pressure controlled rheostat and associated parts.
Figure 5:
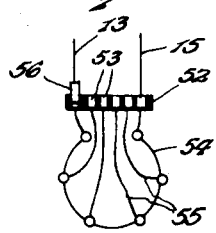
Figure 5 is a diagram of the rheostat.
Figure 4:
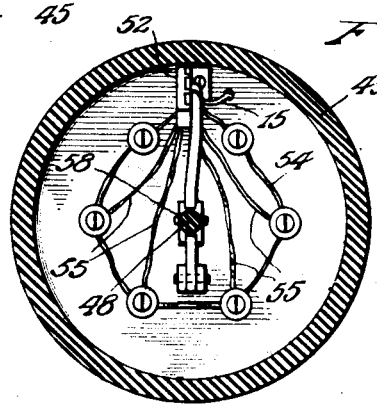
Figure 4 is a section taken along the line 4—4 of Figure 3.

A rheostat is mounted in the housing 45 and referring to Figures 3 and 4 it will be seen that this housing is formed of insulating material so that elements of the rheostat will be properly insulated from each other. This rheostat includes an arcuate bar 52 carrying contacts 53 which are insulated from each other. To the end contacts 53 are secured terminals of a resistance 54 having branches 55 leading to the remaining terminals 53, and referring to Figure 5 it will be seen that the terminal 53 to which one end of the resistance 54 is secured has the wire 15 connected therewith. An arm 56 of conductive material is pivoted at one end to a post 57 to which the wire 13 is connected and intermediate its length the arm carries a transversely extending pin 58 engaged in slots 59 formed in the arms of a fork at one end of the stem or shank 48. Therefore, when the diaphragm is flexed by air pressure to shift the stem 48 longitudinally toward the position shown in Figure 3, the free end of the arm 56 will be moved along the bar 52 from one contact 53 to another and in doing so portions of the resistance 54 of the rheostat will be cut out of the circuit. It will thus be seen that the resistance will be varied and, therefore, the pointer of the cooperating indicator 3 or 4 will be moved to indicate the pressure of air in the tire. If the pressure in the tire is reduced by leakage or for any other cause, the diaphragm will tend to return to normal position indicated by dotted lines in Figure 3, and the arm 56 will be shifted toward the left in Figure 3 and in Figure 5 and the rheostat will cause a corresponding change to be shown upon the indicator connected with the tire. It will thus be seen that each tire when inflated will actuate the operating means carried by the wheel upon which the tire is mounted and the pressures of the front and rear tires of an automobile will be individually indicated upon the corresponding indicators. The driver of an automobile by looking at the indicators upon the instrument board can, therefore, easily and quickly determine whether the tires are properly inflated and also when inflating the tires he can accurately determine when a tire has been sufficiently inflated. This will prevent overinflating and also eliminate danger of running upon a tire which is deflated.

Having thus described the invention, what is claimed as new is:

1. In an apparatus for indicating fluid pressures, a housing, a shell carried by said housing, a diaphragm secured between the shell and housing, the shell having an inlet adapted for connection with a source of fluid under pressure, a rheostat in said housing having insulated contacts and an arm movable from one contact to another, an actuating stem for said arm carried by said diaphragm centrally thereof with one end portion extending from the diaphragm towards the inlet of the shell and its other end connected with the arm whereby the arm will be moved from one contact to another when the diaphragm is flexed in response to variations of pressure of fluid in the shell, a hollow adjusting screw threaded through the inlet, and a spring between the stem and the inner end of said screw.

2. In a device of the character described, a housing open at one end, a shell carried by said housing having an open side facing the open end of the housing and a neck extending outwardly in alinement with the longitudinal axis of the housing, a diaphragm secured between the shell and housing and constituting a flexible partition between the same, a rheostat in said housing having insulated contacts and an arm mounted for movement across the contacts from one to another, a stem secured through said diaphragm centrally thereof and adjustably secured with a portion extending into the housing and connected with said arm for imparting movement to the arm from one contact to another when the stem is shifted longitudinally by movement of the diaphragm, the other end portion of said stem projecting from the diaphragm in the shell toward the neck of the shell, a hollow adjusting screw threaded through said neck, a spring between the screw and the adjacent end portion of said stem, and means for connecting said neck with a source of fluid under pressure and delivering the fluid into the shell through the adjusting screw for actuating the diaphragm.

3. In a device of the character described, a housing open at one end, a cap for the open end of said housing having a neck, a diaphragm constituting a flexible partition between the housing and cap, a stationary contact in said housing, a movable contact in the housing mounted for movement relative to the stationary contact, a stem secured through said diaphragm with a portion extending towards the closed end of the housing and connected with the movable contact for imparting movement to the movable contact when the stem is shifted longitudinally by flexing of the diaphragm, the other end portion of said stem projecting from the diaphragm towards the neck of said cap, a hollow adjusting screw threaded through said neck, a spring between the screw and the adjacent end of said stem, and means for connecting said neck with a source of fluid under pressure and delivering the fluid through the cap for actuating the diaphragm.

EUGENE MELTON DOBBS.